(12) United States Patent
Kim et al.

(10) Patent No.: US 10,587,817 B2
(45) Date of Patent: Mar. 10, 2020

(54) IMAGE PROCESSING METHOD AND ELECTRONIC DEVICE IMPLEMENTING THE SAME

(71) Applicant: Samsung Electronics Co., Ltd., Gyeonggi-do (KR)

(72) Inventors: Dongsoo Kim, Gyeonggi-do (KR); Hwayong Kang, Gyeonggi-do (KR); Eunsoo Chang, Gyeonggi-do (KR); Minkyu Park, Seoul (KR); Minyoung Park, Seoul (KR); Youngkwon Yoon, Seoul (KR); Hyeoncheol Jo, Gyeonggi-do (KR); Jonghoon Won, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 38 days.

(21) Appl. No.: 15/870,439

(22) Filed: Jan. 12, 2018

(65) Prior Publication Data

US 2018/0205869 A1 Jul. 19, 2018

(30) Foreign Application Priority Data

Jan. 13, 2017 (KR) .......................... 10-2017-0006070

(51) Int. Cl.
*H04N 5/235* (2006.01)
*H04N 5/374* (2011.01)
*H04N 5/353* (2011.01)

(52) U.S. Cl.
CPC ......... *H04N 5/2357* (2013.01); *H04N 5/3532* (2013.01); *H04N 5/3742* (2013.01)

(58) Field of Classification Search
CPC .. H04N 5/2357; H04N 5/3532; H04N 5/3742; H04N 13/144; H04N 7/0132;
(Continued)

(56) References Cited

U.S. PATENT DOCUMENTS

2010/0013953 A1* 1/2010 Niikura ................ H04N 5/2353
348/226.1
2011/0221929 A1* 9/2011 Miyahara ............... G03B 7/093
348/226.1

(Continued)

FOREIGN PATENT DOCUMENTS

JP 2011160090 8/2011

*Primary Examiner* — Yogesh K Aggarwal
(74) *Attorney, Agent, or Firm* — The Farrell Law Firm, P.C.

(57) ABSTRACT

Disclosed is an electronic device including an image sensor including a lens, a pixel array configured to convert light collected through the lens into an electric signal and to output the electric signal, a readout circuit configured to convert electric signals sequentially received for each row of the pixel array into pixel data and to output the pixel data, a memory, and a controller configured to control the pixel array, the readout circuit and the memory, and a processor electrically connected to the image sensor. The controller is configured to generate a frame by integrating the pixel data sequentially received from the readout circuit, generate a profile regarding flickering of the collected light using the generated frame and another frame generated prior to the generated frame, and store the generated profile in the memory, obtain a profile set including profiles corresponding to a plurality of frames from the memory, and transfer the generated frame and the obtained profile set to the processor.

14 Claims, 14 Drawing Sheets

(58) Field of Classification Search
CPC ............... H02J 2003/002; G03B 21/40; G01H 2250/301; G02B 26/04
USPC .................................. 348/223.1–229.1, 362
See application file for complete search history.

(56) References Cited

U.S. PATENT DOCUMENTS

| | | |
|---|---|---|
| 2012/0002074 A1 | 1/2012 | Baba et al. |
| 2014/0354847 A1 | 12/2014 | Kasai |
| 2016/0028934 A1 | 1/2016 | Sugawara |
| 2016/0127628 A1* | 5/2016 | Chan .................... H04N 5/2327 348/222.1 |
| 2016/0255264 A1* | 9/2016 | Russell ................... G06F 3/147 348/226.1 |

* cited by examiner (a)

FR : Frame
P : Profile
FK : Flicker information (b)

(c)   
<First channel>  <Second channel>

(d)   
<First channel>  <Second channel>

(e)

IMAGE PROCESSING METHOD AND ELECTRONIC DEVICE IMPLEMENTING THE SAME

PRIORITY

This application claims priority under 35 U.S.C. § 119(a) to Korean Patent Application Serial No. 10-2017-0006070, which was filed in the Korean Intellectual Property Office on Jan. 13, 2017, the entire content of which is incorporated herein by reference.

BACKGROUND

1. Field of the Disclosure

The present disclosure relates generally to an electronic device configured to recognize flickering from a frame obtained by an image sensor.

2. Description of the Related Art

A lamp (e.g., a fluorescent lamp) typically flickers periodically due to the frequency of the alternating current (AC) power. For example, when the power frequency is 50 Hz, the lamp flickers periodically at a frequency of 100 Hz, which is twice the frequency of the AC power at 50 Hz. Thus, a change of brightness is periodically generated with a period of $\frac{1}{100}$ seconds. This variation of brightness may be displayed in a captured image as a striped pattern.

For example, in the case of an image sensor (e.g., a complementary metal oxide semiconductor (CMOS) image sensor) having an image photographing method with a rolling shutter method, light exposure timing may be different for each row of a pixel array. As the lamp flickers, a change of brightness may occur for each row. Such a change of brightness for each row may be displayed on a screen in a striped pattern.

An electronic device can prevent or suppress a striped pattern by detecting the flickering information from a captured image and correcting the captured image using the flickering information. However, in the case of an image sensor having a frame rate higher than a flickering frequency (e.g., can obtain one frame faster than a flickering time), the recognition of flickering information from the obtained frame may be impossible or at best difficult, and the resultant a striped pattern may be displayed.

SUMMARY

According to an aspect of the present disclosure, an electronic device configured to be capable of accurately recognizing flickering using an image sensor implementing a high frame rate is provided.

In accordance with an aspect of the present disclosure, an electronic device includes an image sensor including a lens, a pixel array configured to convert light collected through the lens into an electric signal and to output the electric signal, a readout circuit configured to convert electric signals sequentially received for each row of the pixel array into pixel data and to output the pixel data, a memory, and a controller configured to control the pixel array, the readout circuit and the memory; and a processor electrically connected to the image sensor. The controller is configured to generate a frame by integrating the pixel data sequentially received from the readout circuit, generate a profile regarding flickering of the collected light using the generated frame and another frame generated prior to the generated frame, and store the generated profile in the memory, and obtain a profile set including profiles corresponding to a plurality of frames from the memory and transfer the generated frame and the obtained profile set to the processor.

In accordance with another aspect of the present disclosure, an electronic device includes an image sensor including a lens, a pixel array configured to convert light collected through the lens into an electric signal and to output the electric signal, a readout circuit configured to convert electric signals sequentially received for each row of the pixel array into pixel data and to output the pixel data, a memory, and a controller configured to control the pixel array, the readout circuit and the memory; and a processor electrically connected to the image sensor. The controller is configured to generate one frame by integrating the pixel data sequentially received from the readout circuit, generate a profile regarding flickering of the collected light using the generated frame and another frame generated prior to the generated frame, and store the generated profile in the memory, analyze a plurality of profiles accumulated in the memory, transfer the generated frame and results of the analysis to the processor, wherein the results of the analysis comprise a flickering time.

In accordance with another aspect present disclosure, an electronic device includes an image sensor including a lens, a pixel array configured to convert light collected through the lens into an electric signal and to output the electric signal, a readout circuit configured to convert electric signals sequentially received for each row of the pixel array into pixel data and to output the pixel data, a memory, and a controller configured to control the pixel array, the readout circuit and the memory; and a processor electrically connected to the image sensor. The controller is configured to generate one frame by integrating the pixel data sequentially received from the readout circuit, generate a profile regarding flickering of the collected light using the generated frame and another frame generated prior to the generated frame, and store the generated profile in the memory, generate flickering information by analyzing a plurality of profiles accumulated in the memory, and adjust at least one of the generated frame, a light exposure time of one row of the pixel array, and a frame rate of the readout circuit using the flickering information.

In accordance with another aspect of the present disclosure, a method in an electronic device includes generating, by an image sensor of the electronic device, one frame by integrating sequentially collected pixel data; generating, by the image sensor, a profile regarding flickering of light using the generated frame and another frame generated prior to the generated frame and storing the generated profile in a memory; and obtaining, by the image sensor, a profile set comprising a plurality of profiles from the memory and transferring the generated frame and the obtained profile set to a processor of the electronic device.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
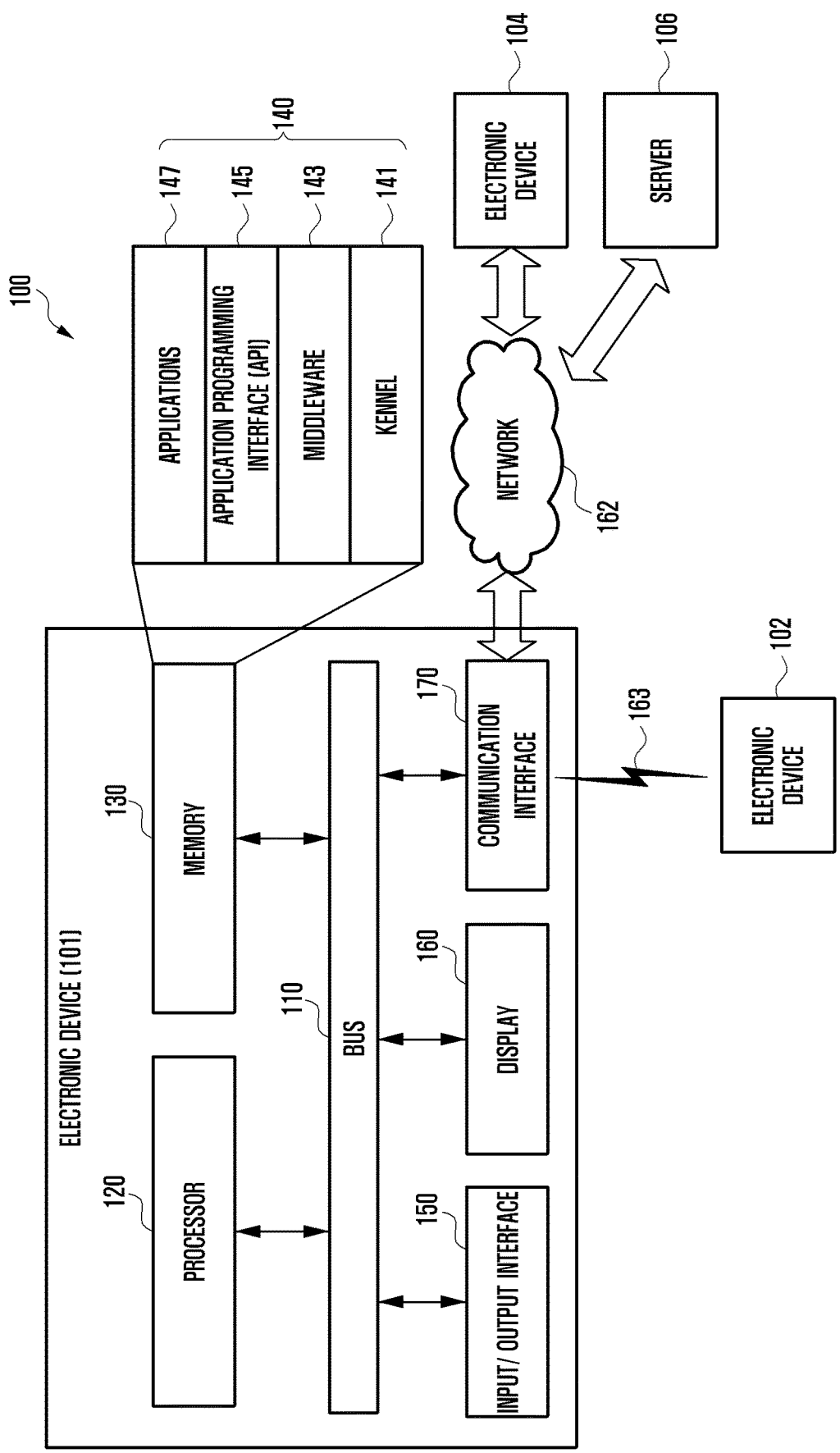
FIG. 1 is a block diagram of an electronic device within a network environment according to an embodiment of the present disclosure.

Various embodiments of the present disclosure are described with reference to the accompanying drawings. The present disclosure includes various details to assist in that understanding, but these details are to be regarded as mere examples. Accordingly, those of ordinary skill in the art will recognize and understand that various changes and modifications of the various embodiments described herein can be made without departing from the scope and spirit of the present disclosure. In addition, descriptions of well-known functions and constructions may be omitted for clarity and conciseness.

The terms and words used in the following description are not limited to their dictionary meanings, but are merely used to provide a clear and consistent understanding of the present disclosure. Accordingly, it should be apparent to those skilled in the art that the following description of various embodiments of the present disclosure is provided for illustration purposes only and not for the purpose of limiting the present disclosure which is defined by the appended claims and their equivalents.

Herein, singular forms such as "a", "an", and "the", include the plural form unless the context clearly dictates otherwise. Thus, for example, reference to "a component surface" includes reference to one or more of such surfaces.

The expressions "include", "have", or "may include", which may be used in describing various embodiments of the present disclosure, may refer, for example, to the existence of a corresponding disclosed function, operation, or component which can be used in various embodiments of the present disclosure and do not limit one or more additional functions, operations, or components. The expressions "or" or "at least one of A and/or B" includes any or all of combinations of words listed together. For example, the expression "A or B" or "at least A and/or B" may include A, may include B, or may include both A and B.

The expressions "1", "2", "first", "second", etc. used in various embodiments of the present disclosure may modify various components but do not limit the corresponding components. The above expressions do not limit the sequence and/or importance of the components, but may be used for distinguishing one component from other components. For example, a first user device and a second user device may indicate different user devices although both of them are user devices. Similarly, without departing from the scope of the present disclosure, a first structural element may be referred to as a second structural element. The second structural element also may be referred to as the first structural element.

When a component is referred to as being "coupled to" or "connected to" another component, the component may be directly coupled or connected to another component, or a further component may exist between the component and another component. However, when a component is "directly coupled to" or "directly connected to" another component, an additional component does not exist between the component and another component.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present description.

According to an embodiment of the present disclosure, an electronic device may be a device including a communication function. For example, the electronic device may include a smart phone, a tablet personal computer (PC), a mobile phone, a video phone, an e-book reader, a desktop PC, a laptop PC, a netbook computer, a personal digital assistant (PDA), a camera, a wearable device (e.g., a head-mounted-device (HMD) such as electronic glasses, electronic clothes, an electronic bracelet, an electronic necklace, an electronic accessary, an electronic tattoo, and a smart watch), etc.

The electronic device may be a smart home appliance having a communication function, such as a television (TV), a digital versatile disc (DVD) player, an audio player, a refrigerator, an air conditioner, a cleaning device, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic frame, etc.

The electronic device may include a medical device (e.g., a magnetic resonance angiography (MRA) device, a magnetic resonance imaging (MRI) device, a computed tomography (CT) device, a scanning device, an ultrasonic device, etc.), a navigation device, a global navigation satellite system (GNSS) receiver, an event data recorder (EDR), a flight data recorder (FDR), a vehicle infotainment device, electronic equipment for a ships (e.g., a navigation device, a gyro compass, etc.), avionics, a security device, a head unit for a vehicle, an industrial or home robot, an automatic teller machine (ATM), a point of sales (POS) device, and an Internet of things (IoT) device (e.g., a fire alarm, various sensors, an electric or gas meter unit, a sprinkler, a thermostat, a streetlamp, a toaster, sport outfits, a hot-water tank, a heater, a boiler, etc.), or the like.

The electronic device may include furniture or a part of a building/structure, an electronic board, an electronic signature receiving device, a projector, and a measuring device (e.g., a water meter, an electricity meter, a gas meter, a radio wave meter, etc.) including a camera function, etc. In addition, the electronic device may be a flexible device. The electronic device may be one or a combination of the above described various devices. However, the electronic device is not limited to the above described devices.

The term "user" used in the present disclosure may refer to a person who uses an electronic device or a device (e.g., an artificial intelligence electronic device) which uses an electronic device.

FIG. 1 is a block diagram of an electronic device within a network environment 100 according to an embodiment of the present disclosure.

Referring to FIG. 1, the electronic device 101 may include various components including a bus 110, a processor 120 (e.g., processing circuitry), a memory 130, an input/output interface 150 (e.g., input/output circuitry), a display 160, and a communication interface 170 (e.g., communication circuitry).

The bus 110 may be a circuit connecting the above described components and transmitting communication (e.g., a control message) between the above described components.

The processor 120 may include various processing circuitry and receive commands from other components (e.g., the memory 130, the input/output interface 150, the display 160, or the communication interface 170) through the bus 110, analyze the received commands, and execute calculation or data processing according to the analyzed commands.

The memory 130 stores commands or data received from the processor 120 or other components (e.g., the input/output interface 150, the display 160, or the communication interface 170), or generated by the processor 120 or other components. The memory 130 may store a software and/or a program 140. For example, the program 140 may include a kernel 141, middleware 143, an application programming interface (API) 145, and applications 147. At least part of the kernel 141, the middleware 143, or the API 145 may be referred to as an operating system (OS).

The kernel 141 controls or manages system resources (e.g., the bus 110, the processor 120, or the memory 130) used for executing an operation or function implemented by the remaining other programming modules, for example, the middleware 143, the API 145, or the applications 147. The kernel 141 provides an interface for accessing individual components of the electronic device 101 from the middleware 143, the API 145, or the applications 147 to control or manage the components.

The middleware 143 performs a relay function of allowing the API 145 or the applications 147 to communicate with the kernel 141 to exchange data. In operation requests received from the applications 147, the middleware 143 performs a control for the operation requests (e.g., scheduling or load balancing) by using a method of assigning a priority, by which system resources (e.g., the bus 110, the processor 120, the memory 130, etc.) of the electronic device 101 can be used, to the applications 147.

The API 145 is an interface by which the applications 147 can control a function provided by the kernel 141 or the middleware 143, and includes, for example, at least one interface or function (e.g., command) for file control, window control, image processing, or character control.

The applications 147 may include a short message service (SMS)/multimedia messaging service (MMS) application, an email application, a calendar application, an alarm application, a healthcare application (e.g., an application measuring quantity of exercise or blood sugar level) or an environment information application (e.g., an application providing information on barometric pressure, humidity, or temperature). The applications 147 may be an application related to an information exchange between the electronic device 101 and an external electronic device (e.g., second external electronic device 104). The applications 147 related to the information exchange may include, for example, a notification relay application for transferring particular information to the external electronic device or a device management application for managing the external electronic device.

For example, the notification relay application may include a function of transmitting notification information generated by another application (e.g., an SMS/MMS application, an email application, a healthcare application, or an environment information application) of the electronic device 101 to the external electronic device (e.g., second external electronic device 104). The notification relay application may receive notification information from, for example, the second external electronic device 104, and provide the received notification information to the user. The device management application may manage (e.g., install, remove, or update) at least a part of functions of the electronic device. For example, the device management application may turn on/off the external electronic device (or some components of the external electronic device), control a brightness of the display of the external electronic device, or communicate with the electronic device 101, an application executed in the second external electronic device 104, or a service (e.g., call service or message service) provided by the second external electronic device 104.

The applications 147 may include an application designated according to an attribute (e.g., type of electronic device) of the second external electronic device 104. For example, when the second external electronic device 104 is a moving picture experts group (MPEG-1 or MPEG-2) audio layer-3 (MP3) player, the applications 147 may include an application related to music reproduction. Similarly, when the second external electronic device 104 is a mobile medical device, the applications 147 may include an application related to healthcare. The applications 147 may include at least one of an application designated to the electronic device 101 and an application received from an external electronic device.

The input/output interface 150 may include various input/output circuitry and/or devices, and transmit a command or data input from the user through an input/output device (e.g., a sensor, a keyboard, or a touch screen) to the processor 120, the memory 130, the communication interface 170, or the display 160 through, for example, the bus 110. The input/output interface 150 may provide data on a user's touch input through a touch screen to the processor 120. Further, the input/output interface 150 may output a command or data received through, for example, the bus 110, from the processor 120, the memory 130, or the communication interface 170 through the input/output device (e.g., a speaker or a display). For example, the input/output interface 150 may output voice data processed through the processor 120 to the user through the speaker.

The display 160 may include, for example, a liquid crystal display (LCD), a flexible display, a transparent display, a light-emitting diode (LED) display, an organic LED (OLED) display, a microelectromechanical systems (MEMS) display, or an electronic paper display, etc. The display 160 may display information (e.g., text, image, video, icon, symbol, etc.) on the screen such that the user may view it. The display 160 may include a touch screen and receive, for example, a touch, a gesture, a proximity, or a hovering input using an electronic pen or a user's body. The display 160 may be one or more displays. For example, the display 160 may be included in the electronic device 101 or included in an external device having a wired or wireless connection with the electronic device 101, thus outputting information offered by the electronic device 101 to users.

The display 160 may be attachable to or detachable from the electronic device 101. For example, the display 160 may include an interface which can be mechanically or physically connected to the electronic device 101. In case the display 160 is detached (e.g., separated) from the electronic device 101 by a user's selection, the display 160 may receive various control signals or image data from the processor 120, e.g., through wireless communication.

The communication interface 170 may include various communication circuitry and establish communication between the electronic device 101 and an external electronic device. For example, the communication interface 170 may be connected to a network 162 through wired or wireless communication, and thereby communicate with an external electronic device. Additionally, the communication interface 170 may establish a short-range wireless communication with an external electronic device. The electronic device 101 may be connected to an external electronic without using the communication interface 170. For example, based on at least one of a magnetic sensor, a contact sensor, a light sensor, etc. that is equipped in the electronic device 101, the electronic device 101 may sense whether an external electronic device is contacted with the electronic device 101, or whether an external electronic device, is attached to the electronic device 101.

Wireless communication may use, as a cellular communication protocol, long-term evolution (LTE), LTE-advance (LTE-A), code division multiple access (CDMA), wideband CDMA (WCDMA), universal mobile telecommunications system (UMTS), wireless broadband (WiBro), global system for mobile communications (GSM), etc. A short-range communication 163 may include wireless fidelity (Wi-Fi), Bluetooth™ (BT), near field communication (NFC), magnetic secure transmission or near field magnetic data stripe transmission (MST), GNSS, etc. The GNSS may include at least one of, for example, a global positioning system (GPS), a Glonass, a Beidou navigation satellite system (Beidou), and a European global satellite-based navigation system (Galileo). Hereinafter, the term GPS may be interchangeably used with the term GNSS in the present disclosure.

Wired communication may include, for example, at least one of a universal serial bus (USB), high definition multimedia interface (HDMI), recommended standard-232 (RS-232), plain old telephone service (POTS), etc. The network 162 may include a telecommunication network including a computer network (e.g., local area network (LAN) or wide area network (WAN)), the Internet, and a telephone network.

The first and second external electronic devices 102 and 104 may be identical to, or different from, the electronic device 101. The first and second external electronic devices 102 and 104 may include, for example, a plurality of electronic devices. The server 106 may include a single server or a group of servers. All or part of operations executed in the electronic device 101 may be executed in other electronic device(s), such as the first and second external electronic devices 102 and 104, or the server 106.

In case the electronic device 101 is required to perform a certain function or service automatically or by request, the electronic device 101 may request an external device to execute instead, or additionally at least part of, at least one or more functions associated with the required function or service. The requested device may execute the requested function and deliver the result of the execution to the electronic device 101. Then, the electronic device 101 may offer the required function or service, based on the received result or by processing the received result. For the above, cloud computing technology, distributed computing technology, or client-server computing technology may be used, for example.

Figure 2:
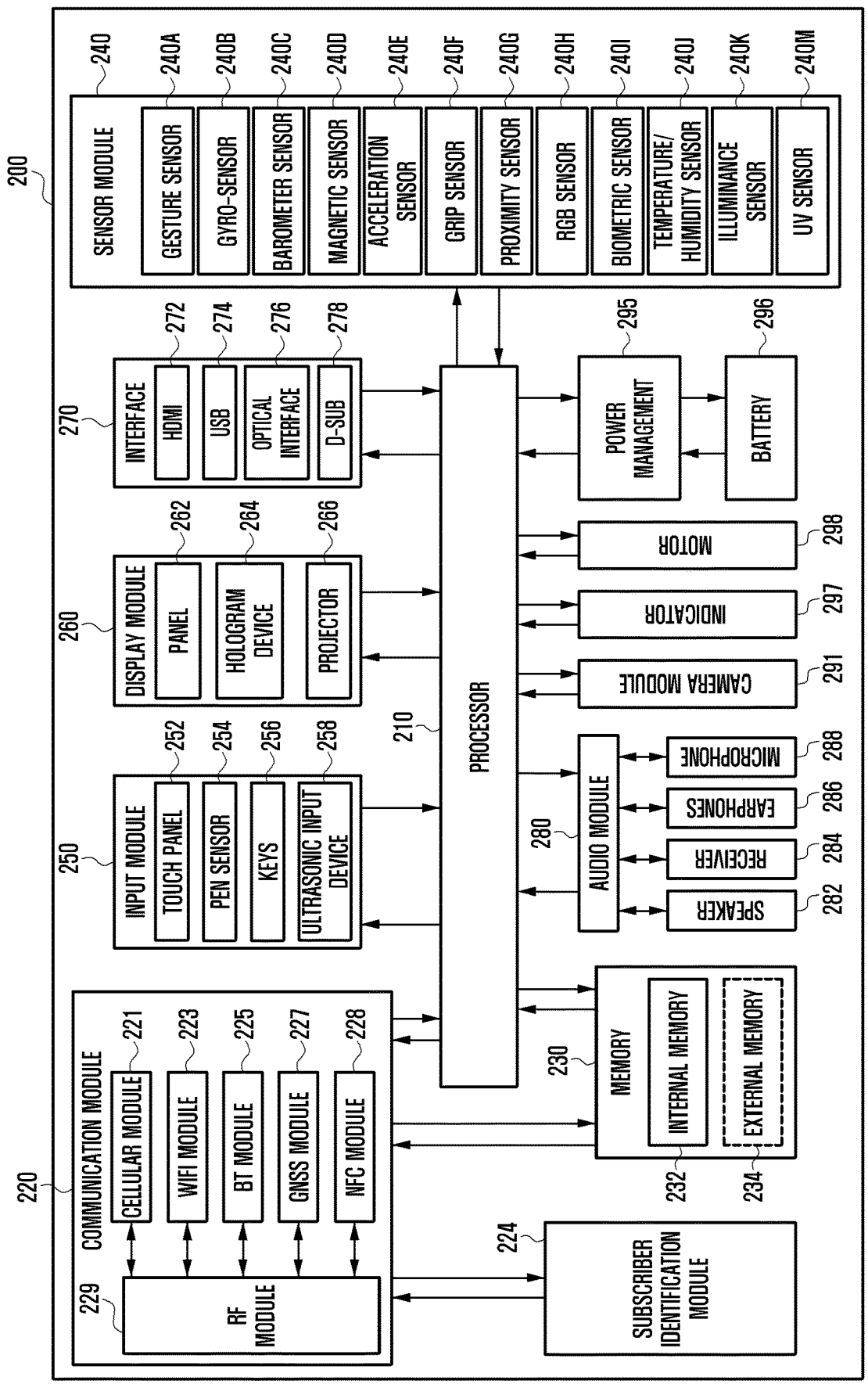
FIG. 2 is a block diagram of an electronic device according to an embodiment of the present disclosure.

FIG. 2 is a block diagram of an electronic device 200 according to an embodiment of the present disclosure.

Referring to FIG. 2 the electronic device 200 may include part or all of the components in the electronic device 101. The electronic device 200 may include one or more processors 210 (e.g., application processors (APs)), a communication module 220 (e.g., communication circuitry), a subscriber identification module (SIM) 224, a memory 230, a sensor module 240, an input module 250 (e.g., input circuitry), a display module 260, an interface 270 (e.g., interface circuitry), an audio module 280, a camera module 291, a power management module 295, a battery 296, an indicator 297, and a motor 298.

The processor 210 may include various processing circuitry, such as, a dedicated processor, a central processing unit (CPU), an AP, an application specific integrated circuit (ASIC), etc., and is capable of driving, for example, an OS or an application program to control a plurality of hardware or software components connected to the processor 210, processing various data, and performing operations. The processor 210 may be implemented as, for example, a system on chip (SoC). The processor 210 may further include a graphic processing unit (GPU) and/or an image signal processor (ISP). The processor 210 may also include at least part of electronic device 200, e.g., a cellular module 221. The processor 210 is capable of loading commands or data received from at least one of the other components (e.g., a non-volatile memory) on a volatile memory, and processing the loaded commands or data. The processor 210 is capable of storing data in a non-volatile memory.

The communication module 220 may include the same or similar configurations as the communication interface 170. For example, the communication module 220 may include various communication circuitry, such as, the cellular module 221, a Wi-Fi module 223, a BT module 225, a GNSS module 227 (e.g., a GPS module, Glonass module, Beidou module, or Galileo module), an NFC module 228, and a radio frequency (RF) module 229.

The cellular module 221 is capable of providing a voice call, a video call, an SMS service, an Internet service, etc., through a communication network. The cellular module 221 is capable of identifying and authenticating the electronic device 200 in a communication network by using the SIM 224 (e.g., a SIM card). The cellular module 221 may be capable of performing at least part of the functions provided by the processor 210. The cellular module 221 may also include a communication processor (CP).

Each of the cellular module 221, Wi-Fi module 223, the BT module 225, the GNSS module 227, and the NFC module 228 may include a processor and various communication circuitry for processing data transmitted or received through the corresponding module. At least part of the cellular module 221, Wi-Fi module 223, BT module 225, GNSS module 227, and NFC module 228, (e.g., two or more modules) may be included in one integrated (IC) chip or one IC package.

The RF module 229 is capable of transmission or reception of communication signals, e.g., RF signals. The RF module 229 may include a transceiver, a power amp module (PAM), a frequency filter, a low noise amplifier (LNA), an antenna, etc. According to an embodiment of the present disclosure, at least one of the following modules including cellular module 221, Wi-Fi module 223, BT module 225, GNSS module 226, NFC module 228, and MST module is capable of transmission or reception of RF signals through a separate RF module.

The SIM module 224 may include a card including a SIM and/or an embodied SIM. The SIM module 224 may also contain unique identification information, e.g., integrated circuit card identifier (ICCID), or subscriber information, e.g., international mobile subscriber identity (IMSI).

The memory 230 may include a built-in internal memory 232 and/or an external memory 234. The built-in internal memory 232 may include a volatile memory, e.g., a dynamic random access memory (DRAM), a static RAM (SRAM), a synchronous dynamic RAM (SDRAM), etc., and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 may include a flash drive, e.g., a compact flash (CF), a secure digital (SD), a micro-SD, a mini-SD, an extreme digital (xD), a multi-media card (MMC), a memory stick, etc. The external memory 234 may be connected to the electronic device 200, functionally and/or physically, through various interfaces.

The memory 230 may store payment information and a payment application serving as one of the application programs. The payment information may refer to credit card numbers and personal identification numbers (PINs), corresponding to a credit card. The payment information may also include user authentication information, e.g., fingerprints, facial features, voice information, etc.

The sensor module 240 may measure or detect a physical quantity, or an operation state of the electronic device 200, and convert the measured or detected information into an electrical signal. The sensor module 240 may include a gesture sensor 240A, a gyro sensor 240B, a barometer sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illuminance sensor 240K, and an ultraviolet (UV) sensor 240M. Additionally or alternatively, the sensor module 240 may also include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. The electronic device 200 may include a processor, configured as part of the processor 210 or a separate component, for controlling the sensor module 240. In this case, while the processor 210 is operating in sleep mode, the processor may control the sensor module 240.

The input module 250 may include a touch panel 252, a digital pen sensor 254, a key 256, or an ultrasonic input device 258. The touch panel 252 may use, for example, at least one of a capacitive type, a resistive type, an infrared type, and an ultrasonic type. The touch panel 252 may include a control circuit. The touch panel 252 may include a tactile layer to offer a tactile feedback to a user. The touch panel 252 may include a pressure sensor (or a force sensor) capable of measuring the strength or pressure of a user's touch. This pressure sensor may be formed integrally with or separately from the touch panel 252.

The digital pen sensor 254 may be a part of the touch panel or include a separate sheet for recognition. The key 256 may include, for example, a physical button, an optical key, or a keypad. The ultrasonic input device 258 may detect ultrasonic waves occurring at an input tool through a microphone 288 and thereby identify data corresponding to the detected ultrasonic waves.

The display 260 may include a panel 262, a hologram device 264, or a projector 266. The panel 262 may include the same or similar configurations as the display 160. The panel 262 may be implemented to be flexible, transparent, or wearable. The panel 262 may also be incorporated into one module together with the touch panel 252. The hologram device 264 may show a stereoscopic image in the air by using light interference. The projector 266 may display an image by projecting light onto a screen. The screen may be located inside or outside of the electronic device 200. The display 260 may further include a control circuit for controlling the panel 262, the hologram device 264, or the projector 266.

The interface 270 may include an HDMI 272, a USB 274, an optical interface 276, or a D-subminiature (D-sub) 278. The interface 270 may be included in the communication interface 170. Additionally or alternatively, the interface 270 may include a mobile high-definition link (MHL) interface, a SD card/MMC interface, or an Infrared Data Association (IrDA) standard interface.

The audio module 280 may provide bidirectional conversion between a sound and an electronic signal. At least part of the components in the audio module 280 may be included in the input/output interface 150. The audio module 280 may process sound information input or output through a speaker 282, a receiver 284, earphones 286, the microphone 288, etc.

The camera module 291 may take both still and moving images. The camera module 291 may include one or more image sensors (e.g., a front image sensor or a rear image sensor), a lens, an ISP, a flash (e.g., an LED or xenon lamp), etc.

The power management module 295 is capable of managing power of the electronic device 200. The power management module 295 may include a power management integrated circuit (PMIC), a charger IC, or a battery gauge. The PMIC may employ wired charging and/or wireless charging methods. Examples of the wireless charging method are magnetic resonance charging, magnetic induction charging, and electromagnetic charging. To this end, the PMIC may further include an additional circuit for wireless charging, such as a coil loop, a resonance circuit, a rectifier, etc. The battery gauge may measure the residual capacity, change in voltage, current, or temperature of the battery 296. The battery 296 takes the form of either a rechargeable battery or a solar battery.

The indicator 297 may display a specific status of the electronic device 200 or a part thereof (e.g., the processor 210), e.g., a boot-up status, a message status, a charging status, etc. The motor 298 may convert an electrical signal into mechanical vibrations, such as, a vibration effect, a haptic effect, etc. The electronic device 200 may further include a processing unit (e.g., GPU) for supporting a mobile TV. The processing unit for supporting a mobile TV is capable of processing media data pursuant to standards, e.g., digital multimedia broadcasting (DMB), digital video broadcasting (DVB), mediaFlo™, etc.

Each of the elements described in the present disclosure may be formed with one or more components, and the names of the corresponding elements may vary according to the type of the electronic device. In various embodiments of the present disclosure, the electronic device may include at least one of the above described elements, and may exclude some of the elements or further include other additional elements. Further, some of the elements of the electronic device may be coupled to form a single entity while performing the same functions as those of the corresponding elements before the coupling.

Figure 3:
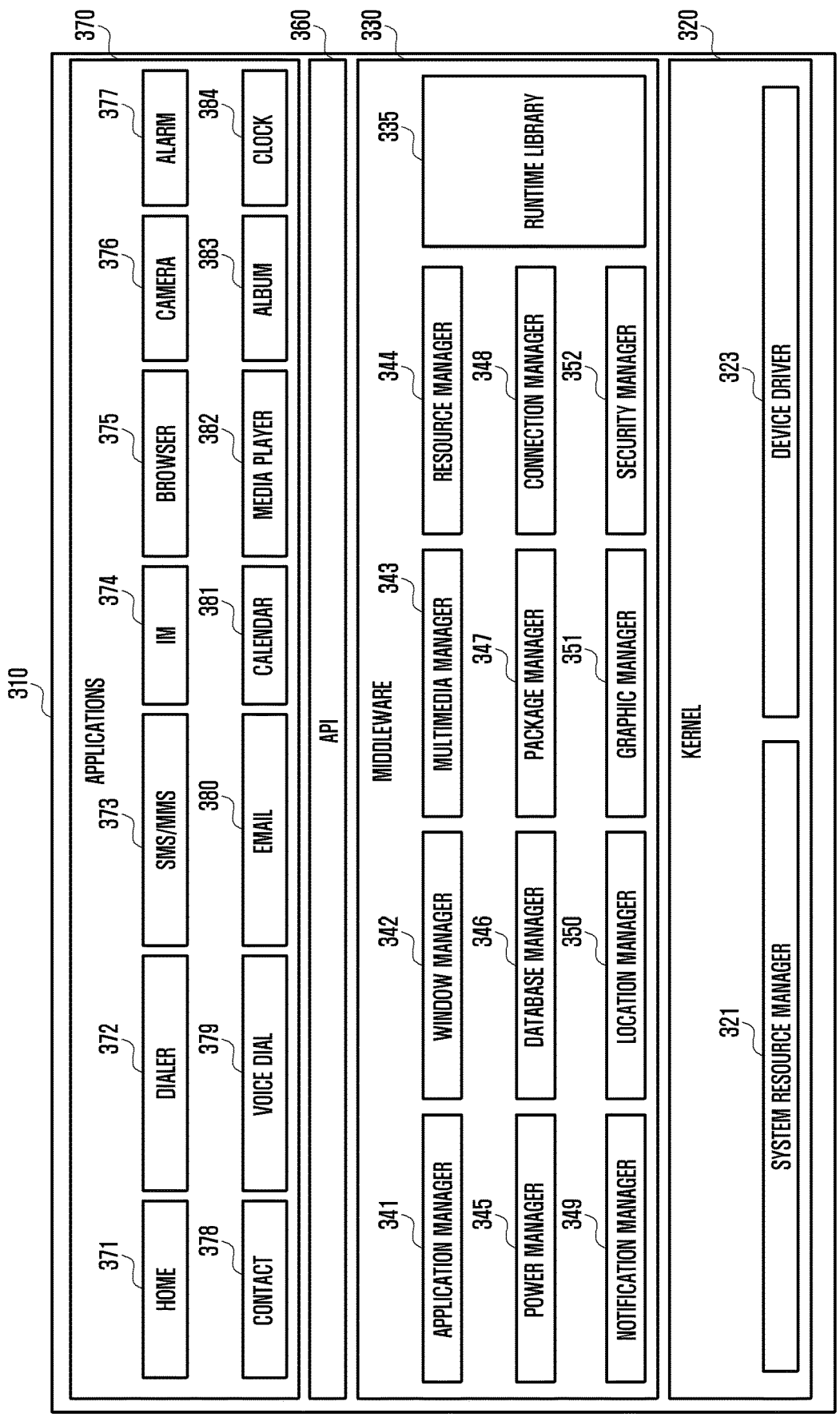
FIG. 3 is a block diagram of a program module according to an embodiment of the present disclosure.

FIG. 3 is a block diagram of a programming module according to an embodiment of the present disclosure.

Referring to FIG. 3, the program module 310 may include an OS for controlling resources related to the electronic device and/or various applications running on the OS. The OS may be Android™, iOS™, Windows™, Symbian™, Tizen™, Bada™, etc.

The program module 310 may include a kernel 320, middleware 330, API 360, and/or applications 370. At least part of the program module 310 may be preloaded on the electronic device or downloaded from a server.

The kernel 320 may include a system resource manager 321 and/or a device driver 323. The system resource manager 321 may include, for example, a process manager, a memory manager, and a file system manager. The system resource manager 321 may perform system resource control, allocation, and recall. The device driver 323 may include, for example, a display driver, a camera driver, a BT driver, a shared memory driver, a USB driver, a keypad driver, a Wi-Fi driver, and an audio driver. Further, the device driver 323 may include an inter-process communication (IPC) driver.

The middleware 330 may provide a function required in common by the applications 370. The middleware 330 may provide a function through the API 360 to allow the applications 370 to use limited system resources within the electronic device. The middleware 330 may include a run-time library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the applications 370 are executed. According to an embodiment of the present disclosure, the runtime library 335 executes input and output, management of a memory, a function associated with an arithmetic function, etc.

The application manager 341 may manage, for example, a life cycle of at least one of the applications 370. The window manager 342 may manage GUI resources used on the screen. The multimedia manager 343 may detect a format required for reproducing various media files, and perform an encoding or a decoding of a media file by using a codec suitable for the corresponding format. The resource manager 344 manages resources such as source code, memory, or storage space of at least one of the applications 370.

The power manager 345 may operate together with a basic input/output system (BIOS) to manage a battery or other power sources, and provides power information required for the operation of the electronic device. The database manager 346 may manage generation, search, and change of a database to be used by at least one of the applications 370. The package manager 347 may manage an installation or an update of an application distributed in a form of a package file.

The connection manager 348 may manage, for example, a wireless connection such as a Wi-Fi or BT connection. The notification manager 349 may display or notify a user of an event such as an arrival message, an appointment, a proximity alarm, etc., in a manner that does not disturb the user. The location manager 350 may manage location information of the electronic device. The graphic manager 351 may manage a graphic effect provided to the user or a user interface (UI) related to the graphic effect. The security manager 352 provides a general security function required for a system security or a user authentication. When the electronic device 101 has a call function, the middleware 330 may further include a telephony manager for managing a voice of the electronic device or a video call function.

The middleware 330 may include modules that provide various combinations of functions of the above described components. The middleware 330 may provide modules specialized according to the type of OS to provide distinct functions. The middleware 330 may be adaptively configured in such a way as to remove part of the existing components or to include new components.

The API 360 may be a set of API programming functions, and may be provided with a different configuration according to the type of the OS. For example, in Android or iOS, a single API set may be provided for each platform. In Tizen, two or more API sets may be provided.

The applications 370 may include one or more applications for performing various functions, for example, a home application 371, a dialer application 372, an SMS/MMS application 373, an instant message application (IM) 374, a browser application 375, a camera application 376, an alarm application 377, a contact application 378, a voice dial application 379, an email application 380, a calendar application 381, a media player application 382, an album application 383, and a clock application 384. Additionally, or alternatively, the applications 370 may include various other applications, such as healthcare (e.g., an application for measuring the amount of exercise, blood sugar level, etc.), and environment information (e.g., an application for providing atmospheric pressure, humidity, temperature, etc.).

The applications 370 may include an application for supporting information exchange between an electronic device 101 and an external device, which is hereafter called information exchange application. The information exchange application is capable of including a notification relay application for relaying specific information to external devices or a device management application for managing external devices.

The notification relay application may include a function for relaying notification information, created in other applications of the electronic device (e.g., SMS/MMS application, email application, healthcare application, environment information application, etc.) to external devices. In addition, the notification relay application is capable of receiving notification information from external devices to provide the received information to the user.

The device management application may manage (e.g., install, remove or update) at least one function of an external device communicating with the electronic device. Examples of the function are a function for turning-on/off the external device or part of the external device, a function for controlling the brightness (or resolution) of the display, applications running on the external device, services provided by the external device, etc. Examples of the services are a call service, messaging service, etc.

The applications 370 may include an application (e.g., a healthcare application of a mobile medical device, etc.) having specified attributes of an external device. The applications 370 may include applications received from an external device. The applications 370 may include a preloaded application or third party applications that can be downloaded from a server. It should be understood that the components of the program module 310 may be called different names according to the type of OS.

According to various embodiments of the present disclosure, at least part of the program module 310 can be implemented with software, firmware, hardware, or any combination thereof. At least part of the program module 310 can be implemented (e.g., executed) by a processor 120. At least part of the programming module 310 may include modules, programs, routines, sets of instructions or processes, etc., in order to perform one or more functions.

Herein, the term 'module' refers to a unit including hardware, software, firmware, or any combination thereof. The term 'module' may be interchangeable with the terms 'unit', 'logic', 'logical block', 'component', 'circuit', etc. A 'module' may be the smallest unit of an integrated component or a part thereof. A 'module' may be the smallest unit that performs one or more functions, or a part thereof. A 'module' may be mechanically or electronically implemented. For example, the 'module' may include at least one of a dedicated processor, a CPU, an ASIC chip, a field-programmable gate array (FPGA), and a programmable-logic device for performing certain operations, which are now known or will be developed in the future.

At least part of the method (e.g., operations) or system (e.g., modules or functions) can be implemented with instructions as programming modules that may be stored in computer-readable storage media. One or more processors can execute instructions, thereby performing the functions. An example of the computer-readable storage media may be the memory 130. At least part of the programming modules can be implemented (e.g., executed) by a processor. At least part of the programming module may include modules, programs, routines, sets of instructions or processes, etc., in order to perform one or more functions.

Examples of computer-readable media include magnetic media, such as hard disks, floppy disks, and magnetic tapes, optical media such as compact disc-ROM (CD-ROM) disks and DVDs, magneto-optical media, such as floptical disks, and hardware devices that are specially configured to store and perform program instructions (e.g., programming modules), such as ROM, RAM, flash memory, etc. Examples of program instructions include machine code instructions created in assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules may include one or more components, remove part of the above-described components, or include new components. The operations performed by modules, programming modules, or the other components, may be executed in a serial, a parallel, a repetitive, or a heuristic fashion. Part of the operations can be executed in any other order, skipped, or executed with additional operations.

FIGS. 4A to 4F illustrate the principle that a striped pattern is generated in the electronic device having an image sensor using a rolling shutter method.

Figure 4A:
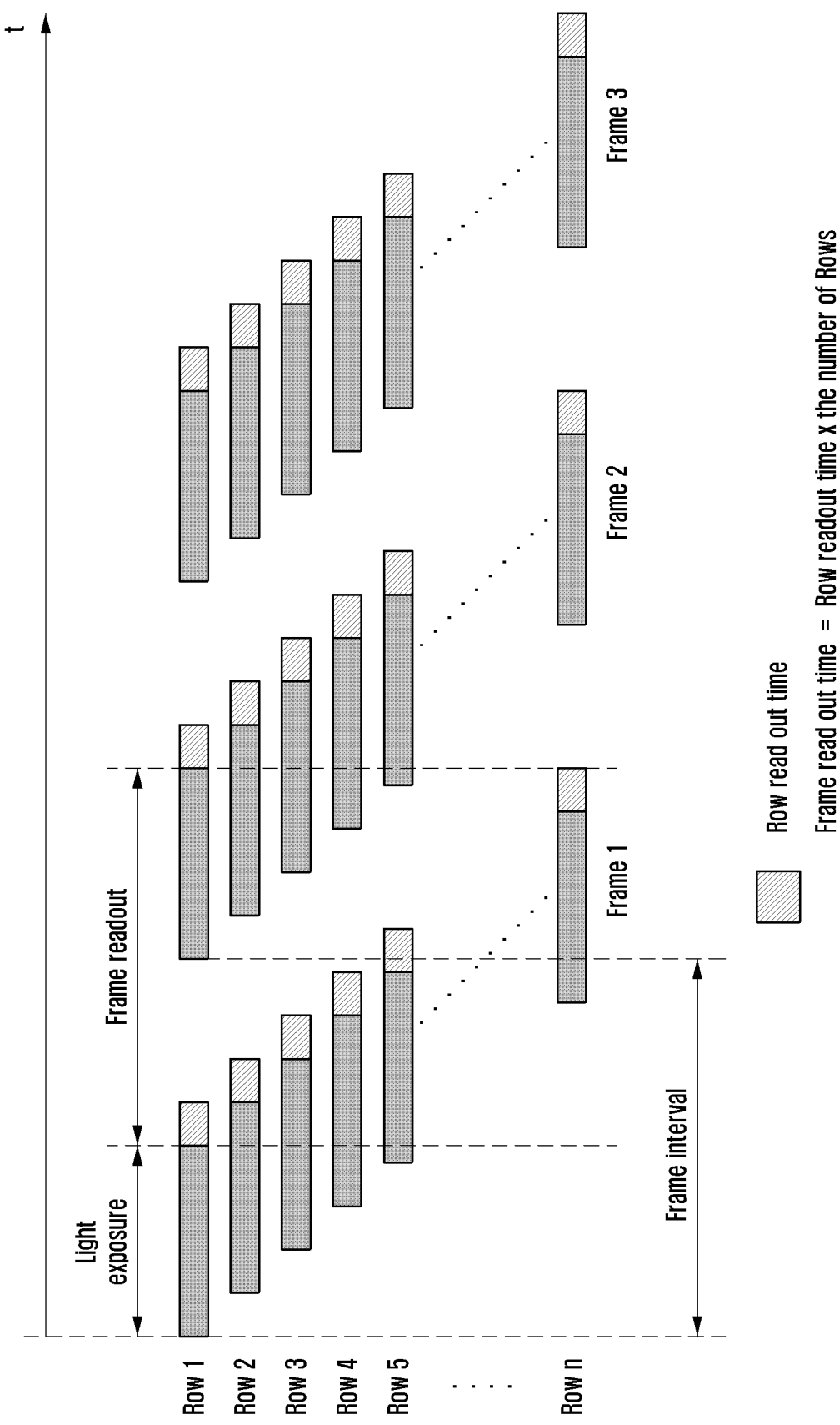
FIGS. 4A to 4F illustrate the principle that a striped pattern is generated in the electronic device having an image sensor using a rolling shutter method.

Referring to FIG. 4A, in an image sensor, a pixel array may have a plurality of rows (e.g., Row 1 to Row n). The rows from the top row (e.g., Row 1) to the bottom row (e.g., Row n) may be sequentially exposed to light from top to bottom, and the pixel data of each row may be sequentially read out. Delay between the exposures of two contiguous rows may be the same as the readout time of one row. Accordingly, a frame readout time may be the same as the product of a row readout time and the number of all of rows. The image sensor may generate one frame by integrating pixel data read out by each row. The time between the light exposure start time of a frame and the light exposure start time of a next frame may be defined as a frame interval. Such a frame interval may be the same for each row.

Figure 4B:
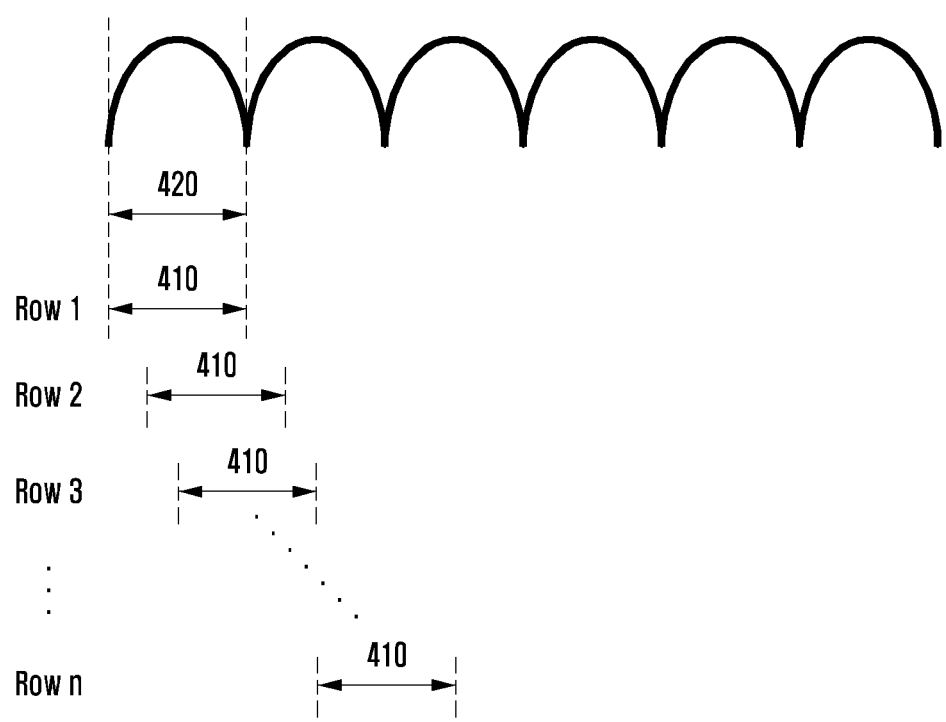

Referring to FIG. 4B, a light may flicker at a frequency twice the frequency of the AC power. In such a light, if the light exposure time of each row is set as N times the flickering time wherein N is a natural number, a striped pattern may not be displayed in an image. For example, as shown in FIG. 4B, if the light exposure time 410 of each row is identical with a flickering time 420 (e.g., 1/100 seconds if the AC power frequency is 50 Hz), the amount of light received for each row may be the same and thus a striped pattern may not be displayed in an image. According to various embodiments of the present disclosure, if the light exposure time of each row is not N times the flickering time, the amount of light received for each row may be different and thus a striped pattern may appear in an image.

Figure 4C:
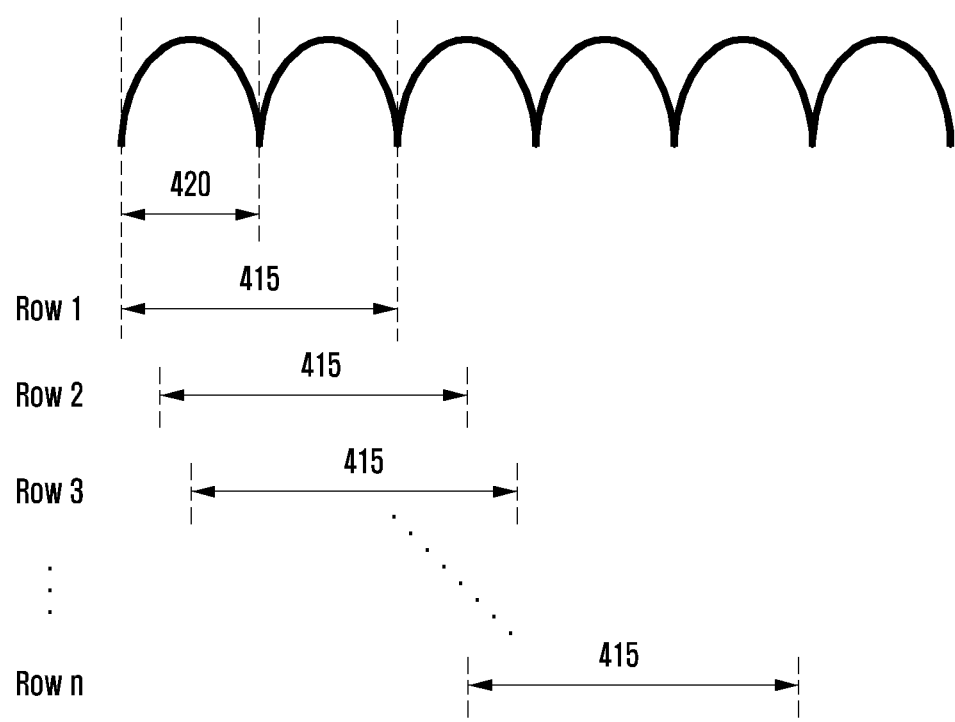

Referring to FIG. 4C, if a light exposure time 415 is twice a flickering time 420, a striped pattern may not be displayed in an image. If a light exposure time is not N times the flickering time, however, a striped pattern may be displayed in an image. Examples in which a striped pattern may be displayed are described below.

Figure 4D:
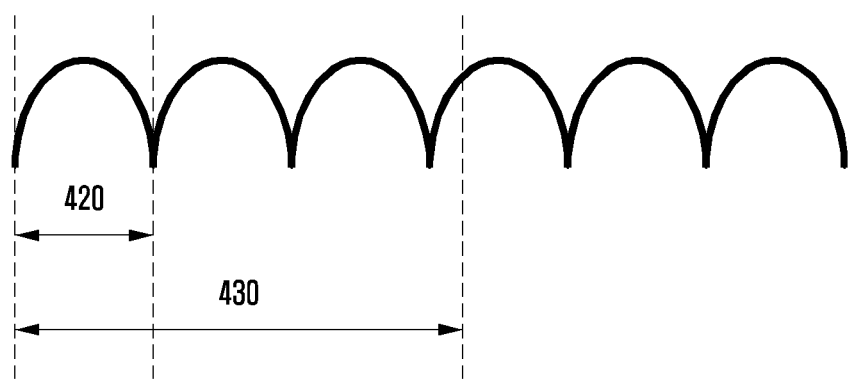

Referring to FIG. 4D, a frame readout time 430 may be 1/30 seconds longer than a flickering time 420 (e.g., 1/100 seconds). Accordingly, information indicative of several times of flickering may be included in one frame, and whether a striped pattern is generated may be recognized from one frame.

Figure 4E:

Referring to FIG. 4E, a frame readout time 440 may be 1/60 seconds longer than the flickering time 420 (e.g., 1/100 seconds). Unlike in FIG. 4D, to recognize whether a striped pattern occurs may be relatively difficult compared to the case of FIG. 4D because information indicative of a piece of flickering only is included in one frame. Accordingly, some contiguous frames may be used to recognize whether a striped pattern occurs.

Figure 4F:
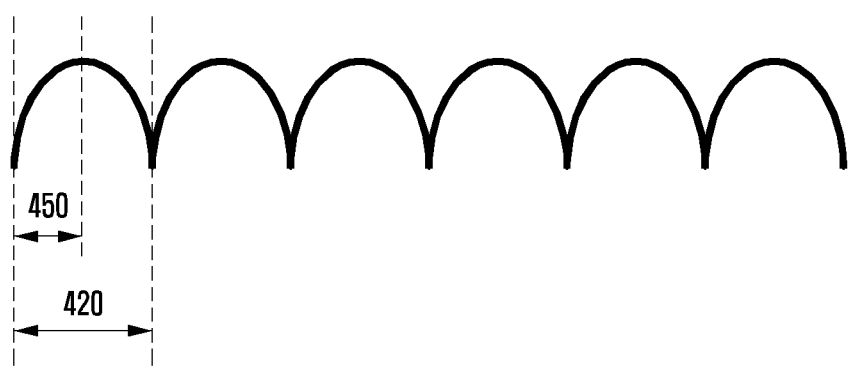

Referring to FIG. 4F, a frame readout time 450 may be, for example, 1/180 seconds shorter than the flickering time 420 (e.g., 1/100 seconds). Accordingly, flickering is not included in information indicative of one frame, and thus whether a striped pattern occurs may not be recognized using one frame. Accordingly, some contiguous frames may be used to recognize a striped pattern.

Figure 5:
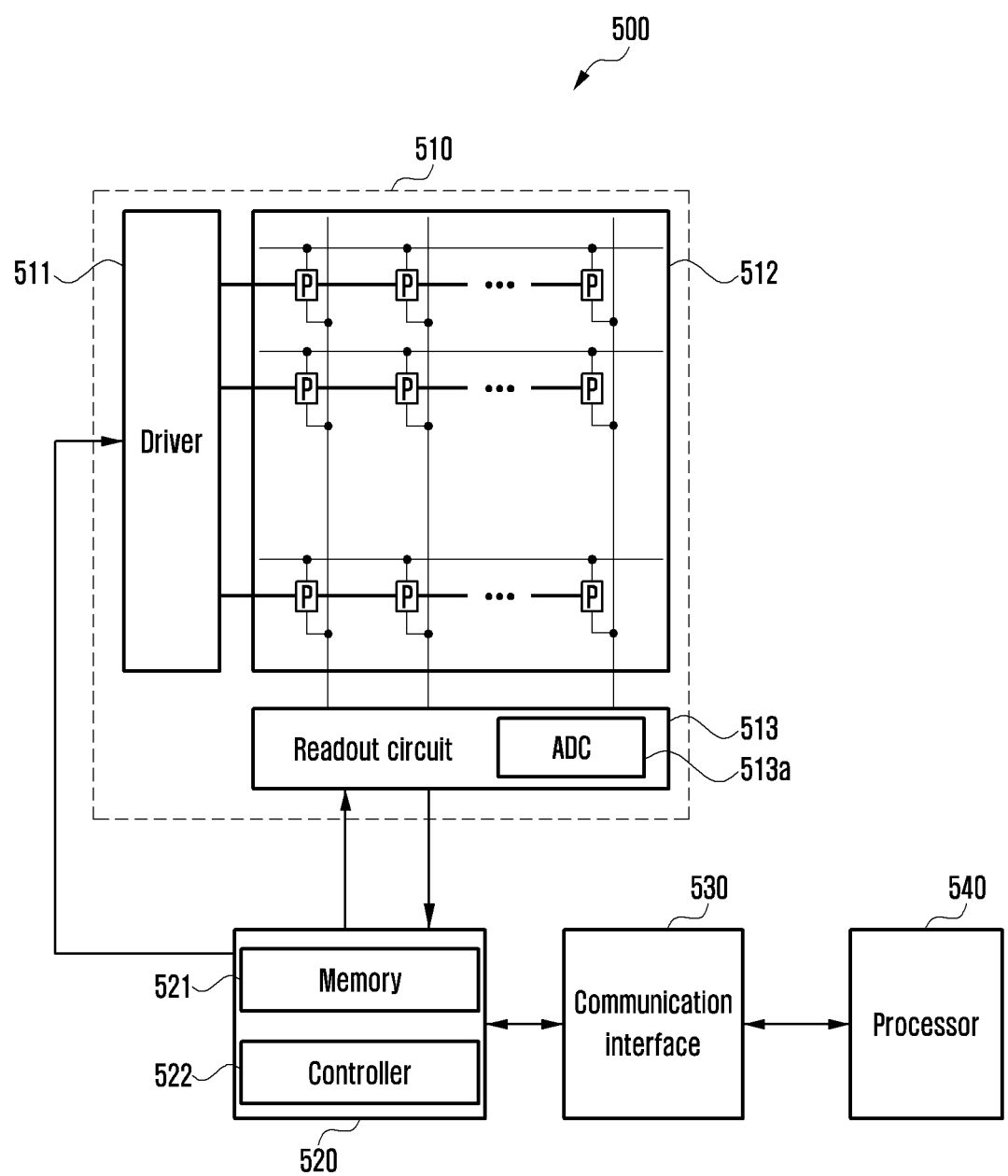
FIG. 5 is a block diagram of an image sensor according to various embodiments of the present disclosure.

FIG. 5 is a block diagram of an image sensor according to various embodiments of the present disclosure. The image sensor 500 may be an element of the camera module 291 included in the electronic device 200, and may generate image data and transfer it to the processor 540 (e.g., an ISP or AP).

Referring to FIG. 5, the image sensor 500 may include an analog block 510, a digital control block 520, and a communication interface 530.

The analog block 510 may convert light received through a lens into an electric signal and output the electric signal to the digital control block 520. For example, the analog block 510 may include a driver 511, a pixel array 512, and a readout circuit 513.

The driver 511 may output a control signal (e.g., a selection signal, a reset signal, and a transmission signal) to the pixel array 512.

The pixel array 512 may include a plurality of pixels P(i, j) (wherein i and j indicate the location of a pixel, i is a row number and j is a column number) arranged in a two dimensional space. For example, each of the pixels may include a photoelectric transformation element (such as a photodetector or position sensitive detector (PSD)) and a plurality of transistors (e.g., a reset transistor, a transmission transistor, a selection transistor, and a driver transistor). Furthermore, the pixel array 512 may include a plurality of column lines. The column lines Lj may be electrically connected to the pixels arrayed in a column line, respectively. In the pixel array 512, the pixels of an i-th row may receive a control signal from the driver 511, may perform photoelectric transformation (converts a light signal into an electric signal) in response to the control signal, and may output the electric signal to the readout circuit 513.

For example, the reset transistor may reset the floating diffusion (FD) area of a corresponding pixel in response to a reset signal RS. The transmission transistor may transmit electric charges accumulated in the photoelectric transformation element to the floating diffusion area in response to a transmission signal. The drive transistor may amplify the electrical potential of the electric charges accumulated in the floating diffusion area. The selection transistor may output the electrical potential amplified by the drive transistor to a column line in response to a selection signal.

The readout circuit 513 may sequentially select column lines one by one, may receive an electric signal from the selected column line, and may output the electric signal to the digital control block 520. In this case, the frame rate (e.g., frame per second (fps)) of the readout circuit 513 may be faster than a flickering frequency. In other words, a so-called frame readout time taken for the readout circuit 513 to read out an electric signal from all of pixels may be faster than a flickering time of one cycle.

The readout circuit 513 may include an analog-to-digital converter (ADC) 513a configured to convert an electric signal received from a selected column line into pixel data and output the pixel data. According to various embodiments of the present disclosure, the ADC 513a may be included in the digital control block 520 or may be included as a separate element.

The digital control block 520 may generate one frame by integrating pixel data sequentially received from the readout circuit 513. Furthermore, the digital control block 520 may generate the profile of a plurality of frames (e.g., a brightness difference between frames or a brightness difference for each row in one frame). According to an embodiment of the present disclosure, the digital control block 520 may output a frame and profile to a processor 540 through the communication interface 530. The digital control block 520 may determine whether a striped pattern occurs by analyzing a profile, and may output the results of the analysis of the profile and a frame to the processor 540 if it is determined that the striped pattern occurs. The digital control block 520 may correct a frame in order to prevent the display of a striped pattern using the results of analysis (e.g., a flickering time), and may output the corrected frame to the processor 540.

The digital control block 520 may further include a controller 522 configured to control the analog block 510, the ADC 513a, and memory 521. The controller 522 may control the operation such as a reset operation (e.g., an operation of outputting a pixel reset signal and located in an i-th column) of the driver 511, a transmission operation (e.g., an operation of outputting a transmission signal to the pixels of the i-th column), and a row line selection operation (e.g., an operation of outputting a selection signal to the pixels of the i-th column). Furthermore, the controller 522 may control the column line selection operation (e.g., an operation of enabling a j-th column line and disabling the remaining column lines) of the readout circuit 513.

The controller 522 may generate one frame by integrating pixel data sequentially received from the readout circuit 513, and may store the frame in the memory 521. The controller 522 may generate a profile using a plurality of frames. The controller 522 may analyze a profile. The controller 522 may correct a frame using the results of analysis (e.g., a flickering time) and a profile (e.g., a brightness difference for each row) so that a striped pattern is not displayed. The controller 522 may control the analog block 510 using the results of analysis and a profile so that a striped pattern is not displayed.

The controller 522 may output a frame stored in the memory 521 to the processor 540 through the communication interface 530 along with a profile or the results of analysis. The controller 522 may also output a corrected frame to the processor 540 through the communication interface 530.

The series of operations (e.g., including the reset operation, the transmission operation, the row line selection operation, the frame generation operation, and the output operation) may be called a streaming operation or streaming mode.

According to various embodiments of the present disclosure, the streaming operation may be performed based on the configuration information stored in the memory 521. For example, the controller 522 may control the streaming operation based on the configuration information stored in the memory 521 in response to a streaming command received from the processor 540 through the communication interface 530. If streaming is not necessary, the image sensor 500 may operate in a standby mode. For example, if the memory 521 is volatile memory, in the standby mode, the memory 521 may be supplied with power of the battery 296 through the power management module 295, for example, so that configuration information is not lost due to power loss, and power of the battery 296 supplied to other elements (e.g., the analog block 510 and the controller 522) may be stopped.

The memory 521 may receive configuration information for a streaming operation from the processor 540 through the communication interface 530, and may store the configuration information. The configuration information stored in the memory 521 may include information about parameters (e.g., a light exposure time, a frame interval, a frame readout time, a frame rate, white balance, a shutter speed, ISO (international organization for standardization) sensitivity, etc.) for camera driving. Furthermore, the configuration information stored in the memory 521 may include information about a designated photographing mode (e.g., a moving image mode, a still photographing mode, a panorama mode, or a scene mode). For example, if the image sensor 500 switches from the standby mode to the streaming mode while the parameters for camera driving or information related to the photographing mode is maintained in the standby mode, the image sensor 500 may generate a frame using the information.

The communication interface 530 may connect the digital control block 520 to the processor 540 through at least one data line and transfer a command from the processor 540 to the digital control block 520.

The communication interface 530 may be an interface configured to transfer configuration information, stored in the memory 230, to the memory 521 under the control of the processor 540 or the controller 522. For example, the communication interface 530 may receive a command for setting the operating mode of the image sensor 500 as the streaming mode or the standby mode from the processor 540, and may transfer the command to the digital control block 520.

The communication interface 530 may output a frame or corrected frame, generated by the digital control block 520, to the processor 540. Furthermore, the communication interface 530 may output a profile generated by the digital control block 520 or the results of analysis using the profile to the processor 540. The communication interface 530 may be implemented in a serial communication manner. For example, serial communication between the digital control block 520 and the processor 540 may support a mobile industry processor interface (MIPI) communication method.

Figure 6:
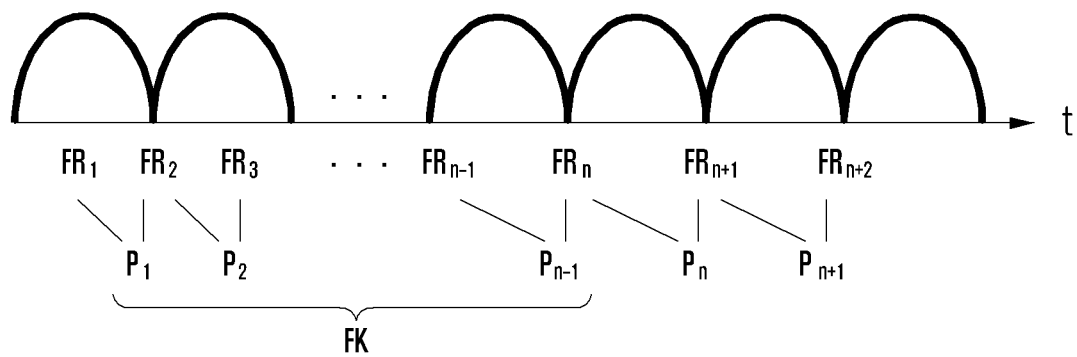
FIG. 6 illustrates the structure of image data transferred from the image sensor to the processor according to various embodiments of the present disclosure.
Figure 6:
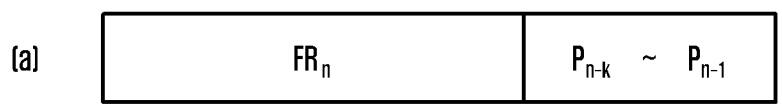
Figure 6:
Figure 6:
Figure 6:
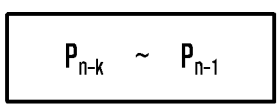
Figure 6:
Figure 6:
Figure 6:
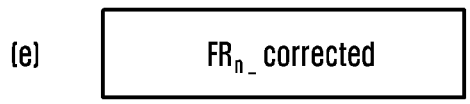

FIG. 6 illustrates the structure of image data transferred from the image sensor to the processor according to various embodiments of the present disclosure.

If the image sensor implements a frame rate (1/(frame readout time)) faster than a flickering frequency (e.g., 100 Hz or 120 Hz) and a frame rate is faster than a data output speed from the communication interface 530 to the processor 540, image data transferred to the processor may have the structure illustrated in FIG. 6.

The controller 522 may generate an n-th generated frame ($FR_n$) by integrating pixel data sequentially received from the readout circuit 513. Furthermore, the controller 522 may generate an (n−1)-th generated profile ($P_{n-1}$). In this case, the $P_{n-1}$ may include a value indicative of a brightness difference for each row between the $FR_n$ and an $FR_{n-1}$. Alternatively, the $P_{n-1}$ may be the value of the $FR_n$ itself other than a brightness difference. For example, the controller 522 may calculate the brightness average value of each of the $FR_{n-1}$ and the $FR_n$, and calculate a difference between the brightness average values as the $P_{n-1}$.

Referring to (a) of FIG. 6, image data may include the $FR_n$ and a profile set $P_{n-k}$ to $P_{n-1}$ located behind the $FR_n$ in structure. Furthermore, the embedded footer of the image data may include information on which the processor identifies the $FR_n$ and the profile set $P_{n-k}$ to $P_{n-1}$. In this case, k may be determined based on a frame rate. For example, if a frame rate is 120 fps and a data output speed from the communication interface 530 to the processor 540 is 30 fps, k may be 8 which is twice the frame rate/data output speed (120/30). Alternatively, k may be determined to be 4 (120/30) or may be a value set by a user. Accordingly, the image data transferred to the processor 540 includes an $FR_9$ and a profile set $P_1$, $P_2$, $P_3$, $P_4$, $P_5$, $P_6$, $P_7$, and $P_8$. Subsequently transferred image data may include an $FR_{10}$ and a profile set $P_1$, $P_2$, $P_3$, $P_4$, $P_5$, $P_6$, $P_7$, $P_8$, and $P_9$.

Referring to (b) of FIG. 6, image data may include the $FR_n$ and a profile set $P_{n-k}$ to $P_{n-1}$ located ahead of the $FR_n$ in structure. For example, the profile set $P_{n-k}$ to $P_{n-1}$ may be included in the embedded header of the image data.

Referring to (c) of FIG. 6, the $FR_n$ and the profile set $P_{n-k}$ to $P_{n-1}$ may be transferred to the processor 540 through different communication channels. For example, the $FR_n$ may be transferred to the processor 540 through a first channel, and the profile set $P_{n-k}$ to $P_{n-1}$ may be transferred to the processor 540 through a second channel. In this case, the channel may mean identification information. For example, the $FR_n$ may be transferred to the processor 540 along with identification information (i.e., the first channel). Furthermore, the profile set may be transferred to the processor 540 along with identification information (i.e., the second channel). The image data and the profile set may be transmitted through separate channels when they are output and may be distinguished by a data type in one channel.

The controller 522 may generate an $F_K$, that is, the results of analysis, by analyzing the profile set $P_{n-k}$ to $P_{n-1}$. For example, if the profiles of the profile set $P_{n-k}$ to $P_{n-1}$ have a pattern in which the profiles are regularly repeated (e.g., ($P_1$, $P_2$, $P_3$, $P_4$, $P_5$, $P_6$, $P_7$, $P_8$)=(1, 1, −1, −1, 1, 1, −1, −1)), the controller 522 may recognize that a light periodically flickers. Furthermore, the controller 522 may calculate a flickering time using the pattern information.

The controller 522 may check a light exposure time in the memory 521 and determine whether a striped pattern is displayed by comparing a flickering time with the light exposure time. Alternatively, the controller 522 may check a frame interval in the memory 521 and determine whether a striped pattern is displayed by comparing a flickering time with the frame interval.

If a light exposure time is N times the flickering time or a frame interval is N/2 times the flickering time, the controller 522 may determine or predict that a striped pattern will not be displayed when a frame is displayed. If the light exposure time is not N times the flickering time or the frame interval is not N/2 times the flickering time, the controller 522 may determine or predict that a striped pattern will be displayed. The $F_K$ may include information indicating whether flickering is present or not, a flickering frequency (or flickering time), and information indicating whether a striped pattern is displayed. The analysis of the profile set $P_{n-k}$ to $P_{n-1}$ and the generation of the $F_K$, that is, the results of the analysis, may be performed by the processor 540 that has received the profile set $P_{n-k}$ to $P_{n-1}$ from the controller 522.

Referring to (d) of FIG. 6, the $FR_n$ and the $F_K$ may be generated by the controller 522 and transferred to the processor 540 through different communication channels. For example, the $FR_n$ may be transferred to the processor 540 through a first channel, and the $F_K$ may be transferred to the processor 540 through a second channel. Frames generated after the $FR_n$ may be transferred to the processor 540 through the first channel.

Referring to (e) of FIG. 6(, the controller 522 may correct the $FR_n$ using the $F_K$ in order to prevent the display of a striped pattern. The controller 522 may output the corrected $FR_n$ to the processor 540 through the communication interface 530. The correction of the $FR_n$ may be performed by the processor 540 that has received the profile set $P_{n-k}$ to $P_{n-1}$ or the $F_K$ from the controller 522.

According to an embodiment of the present disclosure, if it is determined or predicted that a striped pattern will be displayed, the controller 522 may control the driver 511 and the readout circuit 513 to change a frame rate so that a light exposure time becomes N times the flickering time or a frame interval becomes N/2 times the flickering time. Control for a change of the frame rate may be performed by the processor 540 that has determined or predicted that a striped pattern will be displayed using the profile set $P_{n-k}$ to $P_{n-1}$ or the $F_K$ received from the controller 522.

Figure 7:
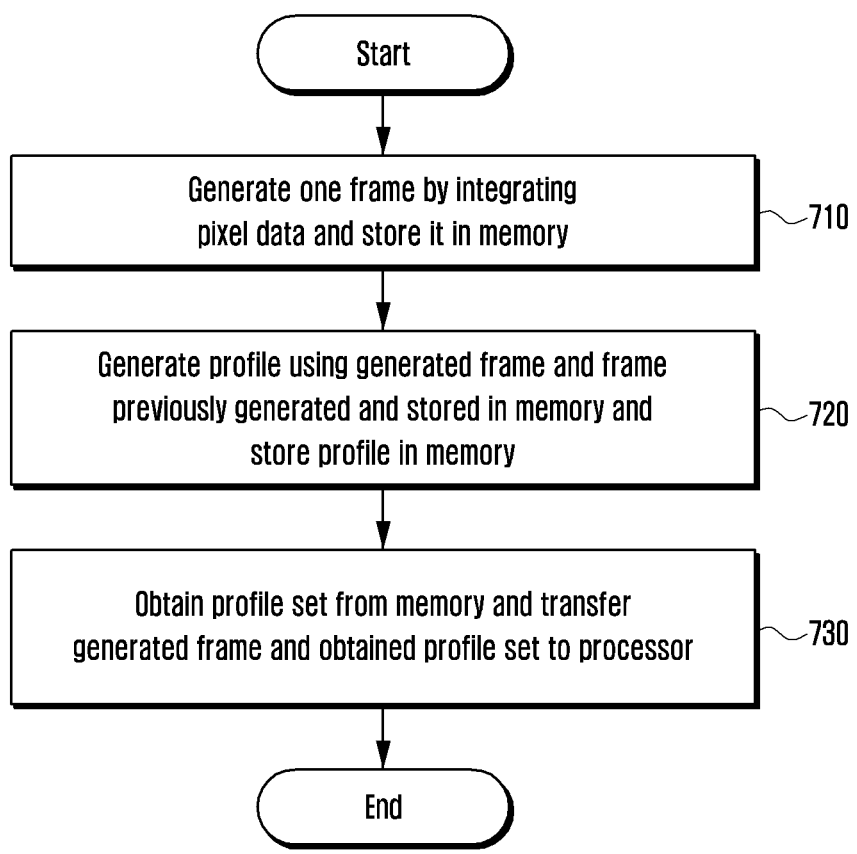
FIG. 7 is a flowchart illustrating an operating method of the image sensor according to various embodiments of the present disclosure.

FIG. 7 is a flowchart illustrating an operating method of the image sensor according to various embodiments of the present disclosure.

In step 710, the controller 522 of the image sensor 500 may generate one frame by integrating pixel data sequentially collected for each row of the pixel array 512 from the readout circuit 513, and may store the frame in the memory 521.

In step 720, the controller 522 may generate a profile using the generated frame and another frame generated prior to the generated frame and stored in the memory 521, and may store the profile in the memory 521.

In step 730, the controller 522 may obtain a profile set from the memory 521 and transfer the generated frame and the obtained profile set to the processor 540 through the communication interface 530. In this case, the structure of the image data transferred to the processor 540 may be the same as illustrated in (a), (b) or (c) of FIG. 6. The processor 540 may analyze the profile set, may correct the frame using the results of the analysis, and may display the corrected frame.

According to an embodiment of the present disclosure, steps 710 to 730 may be repeated until a mode switches (e.g., from the streaming mode to the standby mode).

According to an embodiment of the present disclosure, the generation and transfer of the profile set may be performed once or at several predetermined times. That is, after the profile set is transferred to the processor 540, step 720 may be omitted and only the frame may be transferred to the processor 540. The transfer of a frame may continue until a mode switches (e.g., from the streaming mode to the standby mode).

Figure 8:
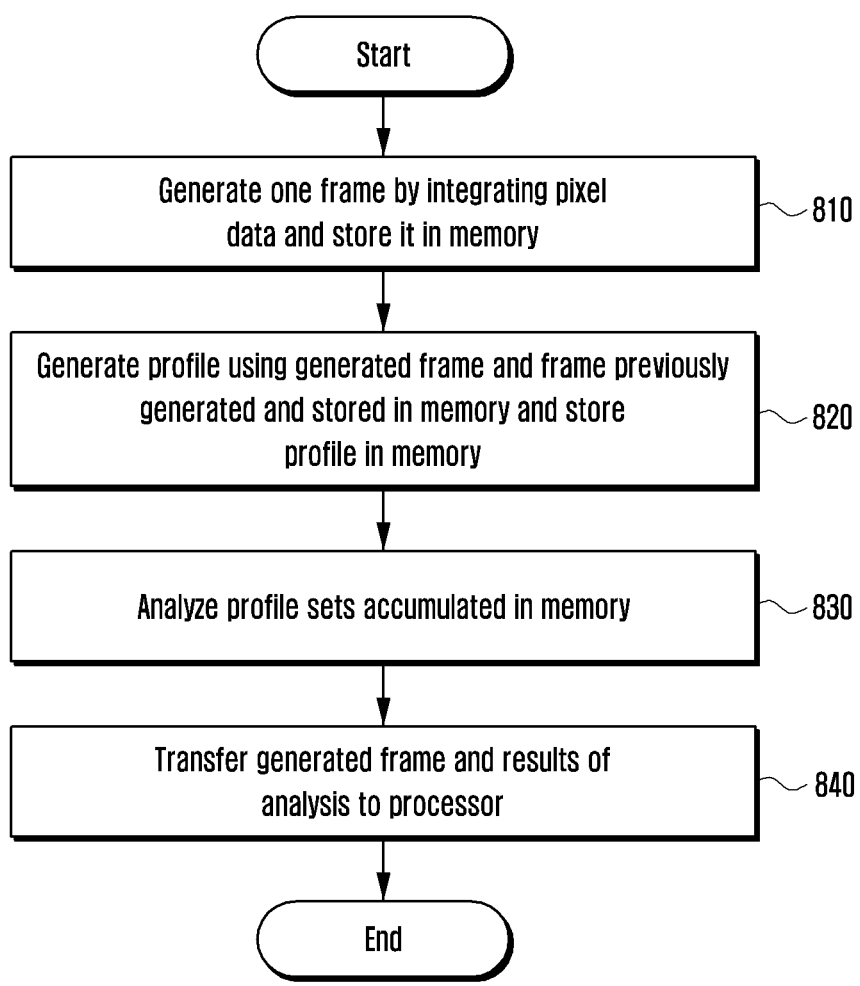
FIG. 8 is a flowchart illustrating an operating method of the image sensor according to various embodiments of the present disclosure.

FIG. 8 is a flowchart illustrating an operating method of the image sensor according to various embodiments of the present disclosure.

In step 810, the controller 522 of the image sensor 500 may generate one frame by integrating pixel data sequentially collected for each row of the pixel array 512 from the readout circuit 513, and may store the frame in the memory 521.

In step 820, the controller 522 may generate a profile using the generated frame and another frame generated prior to the generated frame and stored in the memory 521, and may store the profile in the memory 521.

In step 830, the controller 522 may analyze the profile sets accumulated in the memory 521. The results of the analysis, as illustrated in FIG. 6, may include information indicating whether flickering is present or not, a flickering frequency (or flickering time), and information indicating whether a striped pattern is displayed.

In step 840, the controller 522 may transfer the generated frame and the results of the analysis to the processor 540 through the communication interface 530. In this case, the structure of the image data transferred to the processor 540 may be the same as illustrated in (d) of FIG. 6. The processor 540 may correct the frame using the results of the analysis and display the corrected frame.

According to an embodiment of the present disclosure, steps 810 to 840 may be repeated until a mode switches (e.g., from the streaming mode to the standby mode).

According to an embodiment, the generation and transfer of flickering information may be performed once or several predetermined times. That is, after the results of the analysis are transferred to the processor 540, step 820 and step 830 may be omitted and only the frame may be transferred to the processor 540. The transfer of a frame may continue until a mode switches (e.g., from the streaming mode to the standby mode).

Figure 9:
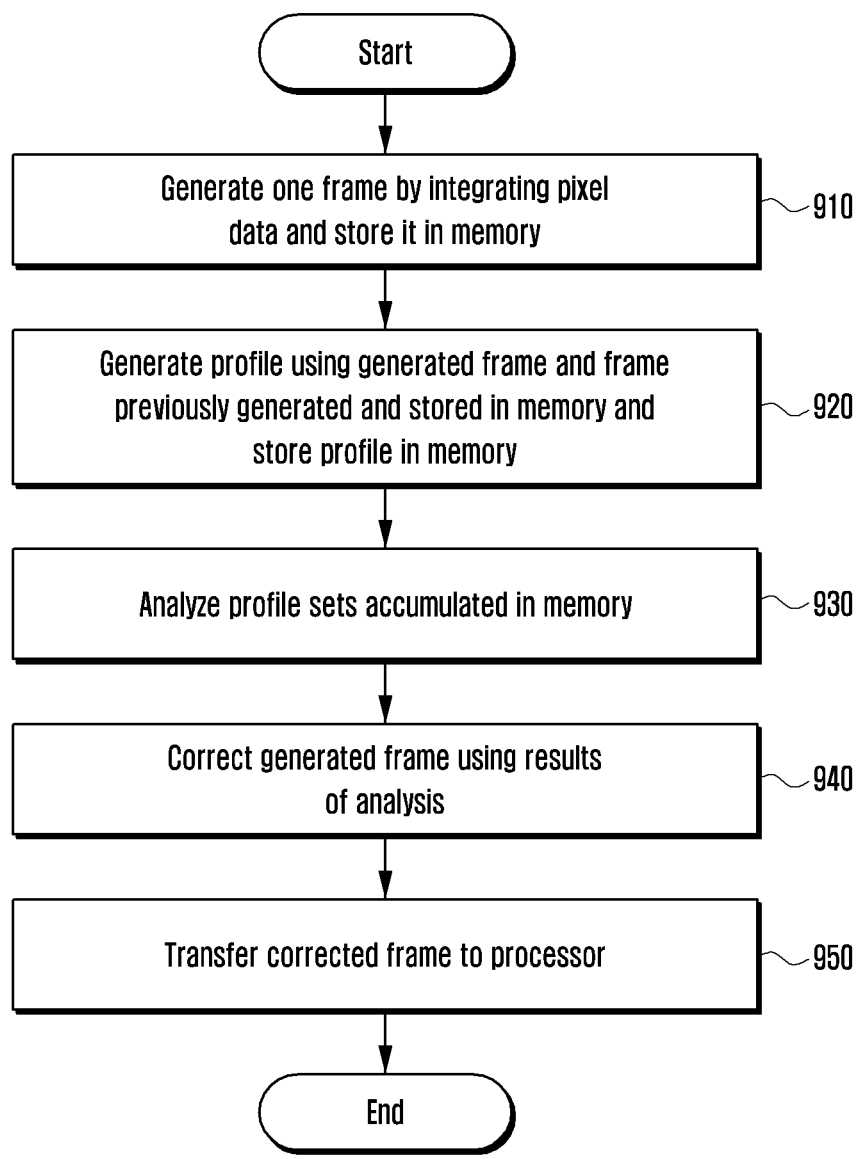
FIG. 9 is a flowchart illustrating an operating method of the image sensor according to various embodiments of the present disclosure.

FIG. 9 is a flowchart illustrating an operating method of the image sensor according to various embodiments of the present disclosure.

In step 910, the controller 522 of the image sensor 500 may generate one frame by integrating pixel data sequentially collected for each row of the pixel array 512 from the readout circuit 513, and may store the frame in the memory 521.

In step 920, the controller 522 may generate a profile using the generated frame and another frame generated prior to the generated frame and stored in the memory 521, and may store the profile in the memory 521.

In step 930, the controller 522 may analyze the profile sets accumulated in the memory 521. The results of the analysis, as illustrated in FIG. 6, may include information indicating whether flickering is present or not, a flickering frequency (or flickering time), and information indicating whether a striped pattern is displayed, for example.

In step 940, the controller 522 may correct the generated frame using flickering information.

In step 950, the controller 522 may transfer the corrected frame to the processor 540 through the communication interface 530. In this case, the structure of the image data transferred to the processor 540 may be the same as illustrated in (e) of FIG. 6.

According to an embodiment of the present disclosure, the transfer of the corrected frame may continue until a mode switches (e.g., from the streaming mode to the standby mode).

According to various embodiments of the present disclosure, an electronic device may include an image sensor configured to include a lens, a pixel array configured to convert light collected through the lens into an electric signal and to output the electric signal, a readout circuit configured to convert electric signals sequentially received for each row of the pixel array into pixel data and to output the pixel data, memory, and a controller configured to control the pixel array, the readout circuit and the memory; and a processor electrically connected to the image sensor. The controller may be configured to generate one frame by integrating the pixel data sequentially received from the readout circuit, generate a profile regarding the flickering of the collected light using the generated frame and another frame generated prior to the generated frame, store the generated profile in the memory, obtain a profile set including profiles corresponding to a plurality of frames from the memory, and transfer the generated frame and the obtained profile set to the processor.

The profile may include a value indicative of a brightness difference between frames or a value indicative of a brightness difference between rows in one frame.

The number of profiles transferred to the processor may be determined based on the frame rate of the readout circuit and a data output speed for the processor.

The image data transferred to the processor may include the generated frame and the obtained profile set located behind or ahead of the generated frame in structure.

The controller may be configured to transfer the generated frame to the processor along with identification information indicative of the generated frame and to transfer the obtained profile set to the processor along with identification information indicative of the obtained profile set.

The processor may be configured to determine whether a striped pattern is displayed in an image to be displayed by analyzing the profile set received from the controller, to correct a frame received from the controller if it is determined that the striped pattern is displayed, and to display the corrected frame.

The processor may be configured to calculate a flickering time by analyzing the profile set received from the controller.

The processor may be configured to recognize a pattern of regularly repeated profiles of the profile set received from the controller and to calculate the flickering time using the recognized pattern information.

The processor may be configured to determine whether a striped pattern is displayed in an image to be displayed by analyzing the profile set received from the controller and to control the image sensor to change the light exposure time of one row of the pixel array or the frame rate of the readout circuit if it is determined that the striped pattern is displayed.

According to various embodiments of the present disclosure, an electronic device may include an image sensor configured to include a lens, a pixel array configured to convert light collected through the lens into an electric signal and to output the electric signal, a readout circuit configured to convert electric signals sequentially received for each row of the pixel array into pixel data and to output the pixel data, memory, and a controller configured to control the pixel array, the readout circuit and the memory; and a processor electrically connected to the image sensor. The controller may be configured to generate one frame by integrating the pixel data sequentially received from the readout circuit, generate a profile regarding the flickering of the collected light using the generated frame and another frame generated prior to the generated frame, store the generated profile in the memory, analyze a plurality of profiles accumulated in the memory, and transfer the generated frame and results of the analysis to the processor. The results of the analysis may include a flickering time.

According to various embodiments of the present disclosure, an electronic device may include an image sensor configured to include a lens, a pixel array configured to convert light collected through the lens into an electric signal and to output the electric signal, a readout circuit configured to convert electric signals sequentially received for each row of the pixel array into pixel data and to output the pixel data, memory, and a controller configured to control the pixel array, the readout circuit and the memory; and a processor electrically connected to the image sensor. The controller may be configured to generate one frame by integrating the pixel data sequentially received from the readout circuit, generate a profile regarding the flickering of the collected light using the generated frame and another frame generated prior to the generated frame, store the generated profile in the memory, generate flickering information by analyzing a plurality of profiles accumulated in the memory, and adjust the generated frame, the light exposure time of one row of the pixel array or the frame rate of the readout circuit using the flickering information.

According to various embodiments of the present disclosure, an image processing method in an electronic device may include generating, by the image sensor of the electronic device, one frame by integrating sequentially collected pixel data; generating, by the image sensor, a profile regarding the flickering of light using the generated frame and another frame generated prior to the generated frame and storing the generated profile in memory; and obtaining, by the image sensor, a profile set including a plurality of profiles from the memory and transferring the generated frame and the obtained profile set to the processor of the electronic device.

Generating the profile may include calculating a brightness difference between frames or calculating a brightness difference between rows in one frame.

Obtaining the profile set may include determining the number of frames to be obtained based on a frame rate of a readout circuit of the image sensor and a data output speed for the processor.

The image processing method may further include generating image data to be transferred to the processor, the image data including the generated frame and the obtained profile set located behind or ahead of the generated frame in structure.

The image processing method may further include determining, by the processor, whether a striped pattern is displayed in an image to be displayed by analyzing the profile set received from the image sensor, correcting a frame received from the image sensor if it is determined that the striped pattern is displayed, and displaying the corrected frame.

Determining whether the striped pattern is displayed may include calculating a flickering time by analyzing the profile set received from the image sensor.

Calculating the flickering time may include recognizing a pattern of regularly repeated profiles of the profile set received from the image sensor and to calculate the flickering time using the recognized pattern information.

According to various embodiments of the present disclosure, an electronic device may be configured to prevent the display of a striped pattern by accurately recognizing flickering because the image sensor configured to implement a frame rate higher than a flickering frequency generates a profile regarding flickering.

The scope of various embodiments of the present disclosure, all of changes or modified of forms derived based on the technical spirit of various embodiments of the present disclosure in addition to the disclosed embodiments should be construed as being included in the scope of various embodiments of the present disclosure.

While the present disclosure has been shown and described with reference to various embodiments thereof, it will be understood by those skilled in the art that various changes in form and details may be made therein without departing from the scope of the disclosure as defined by the appended claims and their equivalents.

What is claimed is:

1. An electronic device, comprising:
   an image sensor including a lens;
   a pixel array configured to convert light collected through the lens into an electric signal and to output the electric signal;
   a readout circuit configured to convert electric signals sequentially received for each row of the pixel array into pixel data and to output the pixel data;
   a memory;
   a processor electrically connected to the image sensor; and
   a controller configured to control the pixel array, the readout circuit and the memory,
   wherein the controller is configured to:
   generate one frame by integrating the pixel data sequentially received from the readout circuit,
   generate a profile regarding flickering of the collected light using the generated frame and another frame generated prior to the generated frame,
   store the generated profile in the memory,
   obtain a plurality of profiles from the memory, and transfer the generated frame and a profile set including the obtained plurality of profiles to the processor, and wherein the controller is further configured to determine a number of profiles to be included in the profile set based on a frame rate of the readout circuit and a data output speed of the processor.

2. The electronic device of claim 1, wherein the generated profile comprises a value indicative of a brightness difference between frames or a value indicative of a brightness difference between rows in one frame.

3. The electronic device of claim 1, wherein image data is transferred to the processor and comprises the generated frame and the profile set located behind or ahead of the generated frame in structure.

4. The electronic device of claim 1, wherein the controller is further configured to transfer the generated frame to the processor along with identification information indicative of the generated frame and to transfer the profile set to the processor along with identification information indicative of the profile set.

5. The electronic device of claim 1, wherein the processor is further configured to determine whether an image to be displayed contains a striped pattern by analyzing the profile set received from the controller, to correct a frame received from the controller if it is determined that the image to be displayed contains the striped pattern, and to display the corrected frame.

6. The electronic device of claim 5, wherein the processor is further configured to calculate a flickering time by analyzing the profile set received from the controller.

7. The electronic device of claim 6, wherein the processor is further configured to recognize a pattern of regularly repeated profiles of the profile set received from the controller and to calculate the flickering time using the recognized pattern information.

8. The electronic device of claim 1, wherein the processor is further configured to determine whether an image to be displayed contains a striped pattern by analyzing the profile set received from the controller and to control the image sensor to change a light exposure time of one row of the pixel array or a frame rate of the readout circuit if the image to be displayed contains the striped pattern.

9. An image processing method in an electronic device, comprising:

generating, by an image sensor of the electronic device, one frame by integrating sequentially collected pixel data;

generating, by the image sensor, a profile regarding flickering of light using the generated frame and another frame generated prior to the generated frame;

storing the generated profile in a memory; and obtaining, by the image sensor, a plurality of profiles from the memory; and transferring the generated frame and a profile set including the obtained plurality of profiles to a processor of the electronic device, wherein a number of profiles to be included in the profile set is determined based on a frame rate of a readout circuit and a data output speed of the processor.

10. The image processing method of claim 9, wherein generating the profile comprises calculating a brightness difference between frames or calculating a brightness difference between rows in a frame.

11. The image processing method of claim 9, further comprising generating image data to be transferred to the processor, the image data including the generated frame and the profile set located behind or ahead of the generated frame in structure.

12. The image processing method of claim 9, further comprising determining, by the processor, whether an image to be displayed contains a striped pattern by analyzing the profile set received from the image sensor, correcting a frame received from the image sensor if an image to be displayed contains the striped pattern, and displaying the corrected frame.

13. The image processing method of claim 12, wherein determining if an image to be displayed contains the striped pattern comprises calculating a flickering time by analyzing the profile set received from the image sensor.

14. The image processing method of claim 13, wherein calculating the flickering time comprises recognizing a pattern of regularly repeated profiles of the profile set received from the image sensor and calculating the flickering time using the recognized pattern information.

* * * * *